United States Patent
Xie et al.

(10) Patent No.: US 9,825,571 B2
(45) Date of Patent: Nov. 21, 2017

(54) DEVICE AND METHOD FOR OPERATING AN ELECTRIC MACHINE

(71) Applicant: Robert Bosch GmbH, Stuttgart (DE)

(72) Inventors: Lingling Xie, Ludwigsburg-Eglosheim (DE); Andreas Koenig, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/104,590

(22) PCT Filed: Nov. 14, 2014

(86) PCT No.: PCT/EP2014/074594
§ 371 (c)(1),
(2) Date: Jun. 15, 2016

(87) PCT Pub. No.: WO2015/090756
PCT Pub. Date: Jun. 25, 2015

(65) Prior Publication Data
US 2016/0380569 A1    Dec. 29, 2016

(30) Foreign Application Priority Data

Dec. 19, 2013  (DE) .................. 10 2013 226 577

(51) Int. Cl.
*H02K 29/08*    (2006.01)
*H02P 23/00*    (2016.01)
(Continued)

(52) U.S. Cl.
CPC .......... *H02P 23/0027* (2013.01); *B60L 3/003* (2013.01); *B60L 3/0046* (2013.01);
(Continued)

(58) Field of Classification Search
CPC ........ H02K 29/12; H02K 29/08; H02K 29/10; H02P 6/14; H02P 6/16; G05B 11/28; G05B 2219/42237; B60W 10/08
(Continued)

(56) References Cited

U.S. PATENT DOCUMENTS 5,731,669 A * 3/1998 Shimizu .............. B60L 11/1807
                                                            318/139
5,874,818 A * 2/1999 Schuurman ....... H02M 7/53873
                                                            318/280
(Continued)

FOREIGN PATENT DOCUMENTS

| CN | 101427456 | 5/2009 |
| DE | 102007020509 | 11/2008 |

(Continued)

OTHER PUBLICATIONS

International Search Report for Application No. PCT/JP2014/074594 dated Feb. 9, 2015 (English Translation, 3 pages).

*Primary Examiner* — Rina Duda
(74) *Attorney, Agent, or Firm* — Michael Best & Friedrich LLP

(57) ABSTRACT

The present invention provides a device and a method for changing over an electric machine from the regular operating mode into the open-circuit mode. In order to avoid excessive increases in voltage and associated adverse effects on the electric machine and the other components, in particular batteries, a further control phase is introduced between the end of the regular operating mode and the freewheeling mode, during which further control phase the voltage at the terminals of the electric machine is continuously adjusted from the voltage previously set in the regular operating mode to the expected open-circuit voltage of the electric machine.

10 Claims, 2 Drawing Sheets

(51) Int. Cl.

| | |
|---|---|
| *B60L 3/00* | (2006.01) |
| *B60L 3/04* | (2006.01) |
| *H02P 27/08* | (2006.01) |
| *H02P 3/18* | (2006.01) |
| *H02P 23/14* | (2006.01) |
| *H02P 21/22* | (2016.01) |
| *H02P 25/024* | (2016.01) |
| *H02P 29/024* | (2016.01) |
| *B60L 11/18* | (2006.01) |
| *B60L 15/00* | (2006.01) |
| *B60L 15/20* | (2006.01) |

(52) U.S. Cl.
    CPC ............... *B60L 3/0061* (2013.01); *B60L 3/04* (2013.01); *B60L 11/1803* (2013.01); *B60L 11/1857* (2013.01); *B60L 15/007* (2013.01); *B60L 15/20* (2013.01); *H02P 3/18* (2013.01); *H02P 21/22* (2016.02); *H02P 23/14* (2013.01); *H02P 25/024* (2016.02); *H02P 27/08* (2013.01); *H02P 29/0241* (2016.02); *B60L 2220/14* (2013.01); *B60L 2240/421* (2013.01); *B60L 2240/423* (2013.01); *B60L 2240/527* (2013.01); *H02P 2207/01* (2013.01); *H02P 2207/05* (2013.01); *Y02T 10/643* (2013.01); *Y02T 10/644* (2013.01); *Y02T 10/645* (2013.01); *Y02T 10/7005* (2013.01); *Y02T 10/705* (2013.01); *Y02T 10/72* (2013.01); *Y02T 10/7275* (2013.01)

(58) Field of Classification Search
    USPC ...... 318/400.37, 400.38, 400.4, 400.39, 599, 318/139
    See application file for complete search history.

(56) References Cited

U.S. PATENT DOCUMENTS

| | | | | |
|---|---|---|---|---|
| 6,850,424 | B2 * | 2/2005 | Baudelot | ............ H02M 5/4585 363/37 |
| 7,279,862 | B1 | 10/2007 | Welchko et al. | |
| 7,489,097 | B2 * | 2/2009 | Fu | ............ B60K 6/26 318/400.01 |
| 7,498,761 | B2 * | 3/2009 | Iwashita | ............ H02P 29/032 318/609 |
| 8,319,460 | B2 * | 11/2012 | Son | ............ H02P 6/20 318/254.1 |
| 2005/0248306 | A1 * | 11/2005 | Chen | ............ H02P 25/03 318/712 |
| 2010/0202089 | A1 * | 8/2010 | Kuehner | ............ B60L 3/0023 361/30 |
| 2011/0095713 | A1 * | 4/2011 | Son | ............ H02P 6/20 318/400.11 |

FOREIGN PATENT DOCUMENTS

| | | |
|---|---|---|
| DE | 102009047616 | 6/2011 |
| DE | 102012002023 | 12/2012 |
| DE | 102011079566 | 1/2013 |
| DE | 102012101508 | 8/2013 |
| JP | 2003259679 | 9/2003 |

* cited by examiner

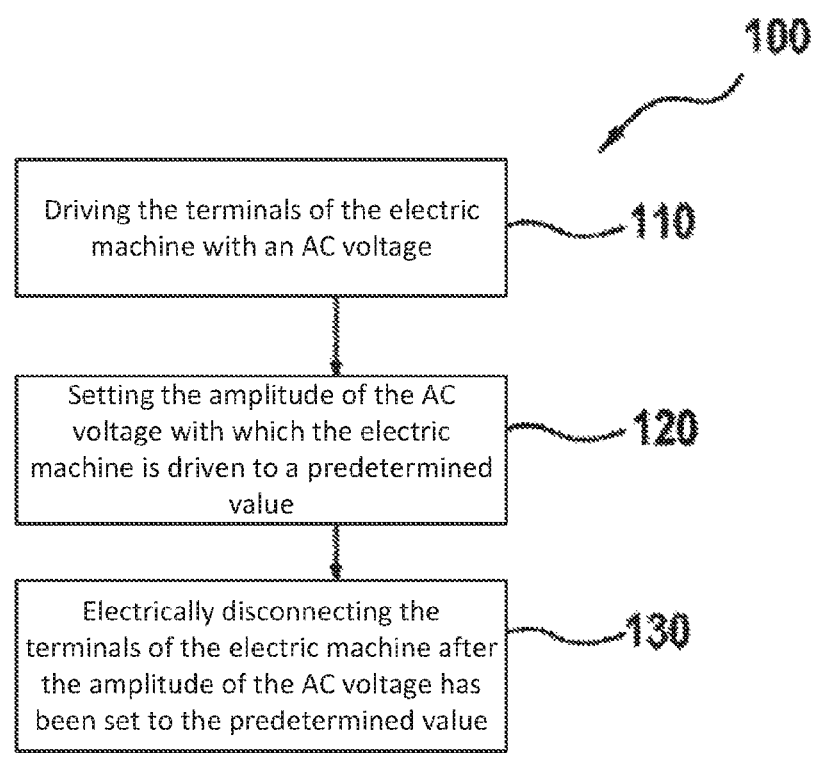

DEVICE AND METHOD FOR OPERATING AN ELECTRIC MACHINE

BACKGROUND OF THE INVENTION

The present invention relates to a device and a method for operating an electric machine. In particular, the present invention relates to a device and a method for operating an electric machine for the transition from a regulated operating mode to a freewheeling mode.

Electric machines, for example, permanently excited synchronous machines, are used in a variety of technical areas. For example, such permanently excited synchronous machines are used in motor vehicles. For safety reasons, previsions must be made for an operating state in the event of a fault. One possibility for setting such an operating state is the so-called freewheeling state. In this case, all terminals of the electric machine are disconnected from each other, and there is no active driving of the electric machine with a voltage. Another safe operating state is the so-called active short circuit. In this case, the terminals of the electric machine are short-circuited with the aid of suitable switching elements.

The German patent application DE 10 2012 010 508 A1 discloses a device and a method for short-circuiting a permanently excited synchronous machine, in which the machine is short-circuited via power converter valves. If a voltage in an intermediate circuit of the drive circuit of the electric machine deviates from a threshold value, the power converter valves are re-opened, and the machine is subsequently operated in the freewheeling state.

Thus, there is a need for a device and a method for operating an electric machine which enables an improved transition from the regulated operating mode to the freewheeling state.

SUMMARY OF THE INVENTION

For this purpose, the present invention provides a device for operating an electric machine, including an inverter which is designed to provide an AC voltage at the terminals of the electric machine in a regulated operating mode, and to electrically disconnect the terminals of the electric machine from each other in a freewheeling mode, wherein the inverter is furthermore designed to set the amplitude of the AC voltage provided at the terminals of the electric machine to a predetermined value during a transition from the regulated operating mode to the freewheeling mode.

The present invention furthermore provides a method for operating an electric machine, including the steps of driving the terminals of the electric machine with an AC voltage; setting the amplitude of the AC voltage with which the electric machine is driven to a predetermined value; and electrically disconnecting the terminals of the electric machine after the amplitude of the AC voltage has been set to the predetermined value.

The present invention is based on the idea, when requesting a transition from the regulated operating mode to the freewheeling mode of an electric machine, of not carrying out this transition abruptly, but rather first adjusting the voltage at the terminals of the electric machine to the anticipated voltage values during the freewheeling operation in a regulated manner. A transition to the freewheeling mode is actually made only after the voltage ratios at the terminals of the electric machine have been set which correspond to the voltage ratios of the freewheeling mode. In this way, voltage jumps may be avoided or at least reduced. During the transition from the regulated operating mode to the freewheeling mode, no voltage jumps occur which are harmful to the overall system, which may result in overvoltages and thus cause damage to the system. In particular, because of the smooth transition from the regulated operating mode to the freewheeling mode and the subsequent freewheeling phase, uncontrollable voltage increases in an intermediate circuit may be prevented. This also results in a lower loading of the power supply, for example, the traction battery of an electric or hybrid vehicle. Thus, these relatively expensive and sensitive batteries may be protected, and the service life of the batteries is thereby increased.

According to one exemplary embodiment, the predetermined value to which the voltage is set during a transition from the regulated operating mode to the freewheeling mode corresponds to a voltage at the terminals of the electric machine in the freewheeling mode. If the freewheeling voltage is first actively set at the electric machine by regulating the inverter, it is subsequently possible to transition to the freewheeling mode without the occurrence of voltage jumps.

According to one exemplary embodiment, the voltage at the terminals of the electric machine in the freewheeling mode is determined as a function of the rotational speed of the electric machine. The freewheeling voltage of the electric machine is generally a function of the rotational speed. By adjusting the voltage to be set during the transition from the regulated operating mode to the freewheeling mode as a function of the rotational speed, it is thus possible to achieve an excellent adjustment of the voltage to be set.

According to one exemplary embodiment, the device comprises a rotational speed sensor which is designed to determine the rotational speed of the electric machine. By determining the rotational speed of the electric machine with the aid of a rotational speed sensor, it is possible to achieve a highly accurate determination of the rotational speed and thus a precise adjustment of the freewheeling voltage to be set. Alternatively, it is also possible to obtain the rotational speed from other sources, for example, to use the setpoint rotational speed previously set in the regulated operating mode, or to estimate the rotational speed based on a model.

According to one exemplary embodiment, the inverter is designed to set the amplitude of the AC voltage to the predetermined value within a predetermined period of time after the termination of the regulated operating mode. In this way, an exact time window may be predefined, within which a transition from the regulated operating mode to the freewheeling mode is to be carried out.

According to one exemplary embodiment, the inverter is designed to adjust the amplitude of the AC voltage by a predefined voltage difference per period of time after the termination of the regulated operating mode. This voltage difference per period of time corresponds to a slope of the change in the voltage ratios at the terminals of the electric machine. It is thus possible to reduce the loading for changing the voltage ratios at the electric terminals.

According to one exemplary embodiment, the inverter comprises a plurality of semiconductor circuits, wherein the semiconductor circuits are open in the freewheeling mode. Semiconductor circuits are especially well suited for driving electric machines. These semiconductor circuits switch in a wear-free manner and very rapidly. In addition, they are now available at very low prices.

Another exemplary embodiment comprises an electric drive device including an electric machine and a device according to the present invention for operating the electric machine.

According to another exemplary embodiment, the electric machine comprises a permanently excited synchronous machine.

According to another exemplary embodiment, the present invention provides a motor vehicle including an electric drive device according to the present invention.

According to another exemplary embodiment, during the step of setting the electric machine, the method for operating the electric machine drives the electric machine with an AC voltage which corresponds to a terminal voltage of the electric machine in the freewheeling state.

Additional advantages and exemplary embodiments result from the description below with reference to the attached figures.

BRIEF DESCRIPTION OF THE DRAWINGS

FIG. 3 shows a schematic representation of a flow chart of a method forming the basis of another exemplary embodiment.

DETAILED DESCRIPTION

Figure 1:
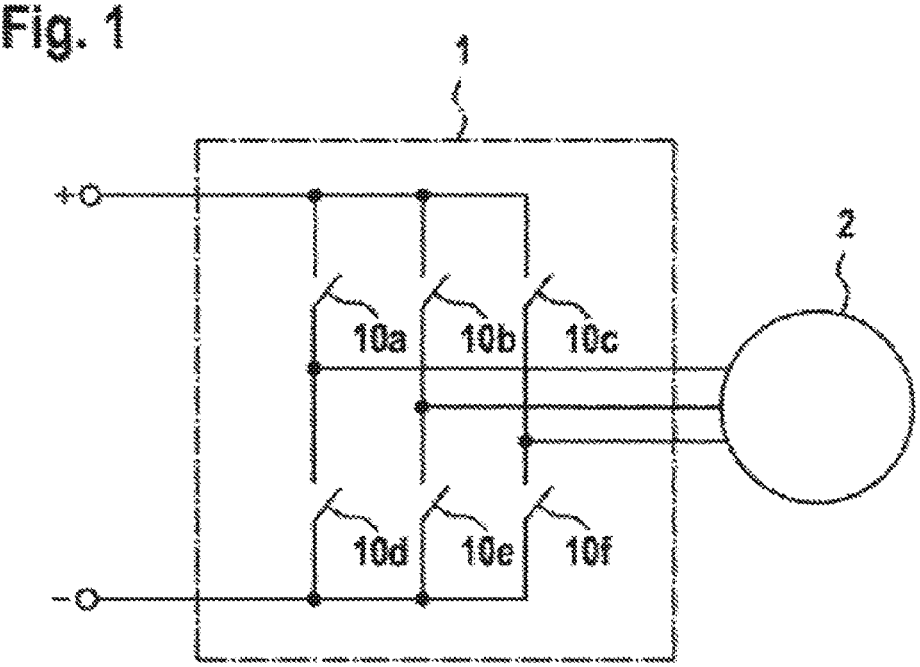
FIG. 1 shows a schematic representation for driving an electric machine in the freewheeling state.

FIG. 1 shows a schematic representation for driving an electric machine 2 via an inverter 1 in the freewheeling state. The electric machine 2 may, for example, be a synchronous machine, preferably a permanently excited synchronous machine. Alternatively, other electric machines are possible, for example, an asynchronous machine or the like. In the exemplary embodiment depicted here, as in the further description below, the present invention is described with reference to a three-phase electric machine. In addition, electric machines having a number of phases differing from this are also possible.

The inverter 1 is supplied by a DC voltage source (not shown here). In this case, the DC voltage source may, for example, be a battery, for example, the traction battery of a hybrid or electric vehicle. In addition, other DC voltage sources or an AC-DC converter for supplying the inverter are also possible. The inverter 1 includes a plurality of switching elements 10a to 10f. These switching elements may preferably be semiconductor switching elements, for example, IGBTs or MOSFETs. Such semiconductor switching elements are capable of carrying out a large number of switching cycles at a very high switching frequency without wear. In addition, a flyback diode is preferably arranged in parallel with each of these switching elements 10a to 10f.

In the freewheeling mode, all switching elements 10a to 10f of the inverter are open. The terminals of the electric machine 2 are thus all electrically disconnected from each other. A current flow is possible in this freewheeling mode only via the flyback diodes connected in parallel with the semiconductor switching elements.

On the other hand, in the regulated operating mode, the switching elements 10a to 10f are driven selectively in order to provide a voltage signal at each of the terminals of the electric machine 2 via suitable modulation. Depending on the modulation or amplitude of the voltage thus provided at the terminals of the electric machine 2, a desired torque or a desired rotational speed may thus be set in the regulated operating mode.

If a fault occurs in the electric drive device, it may be necessary that the electric machine 2 is not allowed to continue to be operated in the regulated operating mode, but rather must transition to the freewheeling mode. In the case of an abrupt transition from the regulated operating mode to the freewheeling mode, in which all switching elements 10a to 10f are suddenly opened immediately, undesirable voltage overshoots may occur. These voltage overshoots must be taken into consideration when sizing the inverter 1 and the electric machine 2. In addition, there is the risk that such voltage overshoots will damage the components in the electric drive device or will at least negatively affect the service life.

Figure 2:
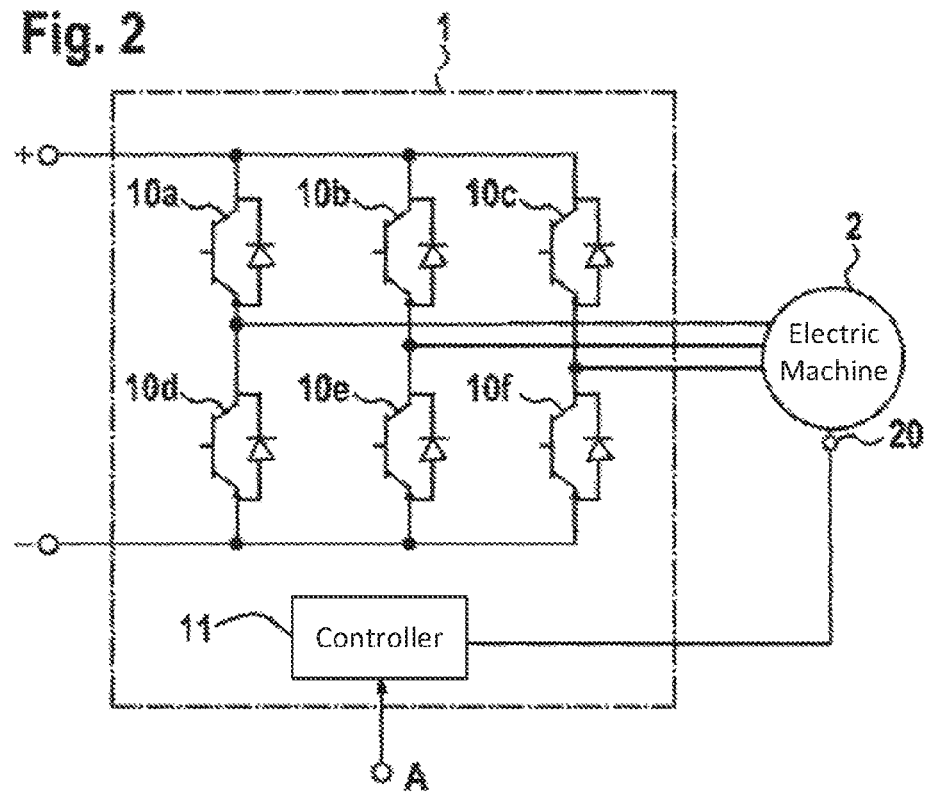
FIG. 2 shows a schematic representation of an electric drive system according to one exemplary embodiment of the present invention.

FIG. 2 shows a schematic representation of an electric drive device according to one exemplary embodiment of the present invention. The electric drive device comprises an inverter 1 and an electric machine 2, similarly to the depiction in FIG. 1. In the event of a fault, the regulated operating mode may be ended and a transition may be made to a freewheeling mode via a signaling at the terminal A. However, after signaling a transition from the regulated operating mode to the freewheeling mode, a controller 11 does not terminate the regulated operating mode and subsequently open the switching elements 10a to 10f of the inverter in an abrupt manner; rather, the voltage ratios provided by the inverter are first continuously adjusted until the voltage ratios at the terminals of the electric machine 2 correspond to the anticipated freewheeling voltage.

For this purpose, the rotational speed of the electric machine 2 is first determined via the controller 11. For example, the electric machine 2 may include a rotational speed sensor 20 for this purpose, which detects the instantaneous rotational speed of the electric machine 2 and provides it to the controller 11. In addition, it is also possible to use a setpoint value for the instantaneous rotational speed at the point in time of the request for the transition from the regulated operating mode to the freewheeling mode as an initial value for determining the freewheeling voltage. Alternative methods for determining the rotational speed, for example, a modeling of the overall drive system and a calculation of the rotational speed of electric machine 2 based on it, are also possible.

On the basis of the rotational speed of the electric machine 2, the controller 11 subsequently ascertains the freewheeling voltage of the electric machine 2 corresponding to this rotational speed. This freewheeling voltage will generally be lower than the voltage which was set at the point in time of the request during the regulated operation.

The controller 11 will then successively adjust the voltage provided via the inverter 1 at the terminals of the electric machine 2 from the instantaneous voltage to the ascertained value of the freewheeling voltage. The adjustment may occur, for example, within a predetermined period of time Δt. For example, time intervals of several milliseconds, for example, 5 milliseconds to 20 milliseconds, have proven to be suitable for adjusting the voltage ratios from the regulated voltage to the freewheeling voltage. However, other time intervals are also possible.

Alternatively, it is also possible to vary the voltage at the terminals of the electric machine 2 by a predefined voltage slope via the controller 11. For example, the amplitude of the AC voltage to be set at the terminals of the electric machine 2 may be lowered (or also increased if necessary) by a predefined voltage difference per time unit. Thus, it may be ensured that no excessive voltage changes occur during the adjustment process.

In this case, the controller 11 may factor possible available sensor values such as the rotational speed or possibly voltage or current ratios, etc. into the regulating process, in order to set the voltage to be set at the electric machine 2 as precisely as possible to the instantaneous freewheeling voltage.

The freewheeling voltage to be set as a function of the rotational speed may, for example, be stored in a memory inside or outside of the controller 11. For example, for this purpose, to specify the freewheeling voltages to be set as a function of the rotational speed, the required voltage variables may be provided in a table. In order to keep the number of required voltage values which must be stored for this purpose to a minimum, in addition, the freewheeling voltage may also be interpolated for rotational speeds between two stored nodes. In addition, alternative options for determining the rotational speed-dependent freewheeling voltages are also possible. For example, the freewheeling voltage may also be stored as a model inside the controller 11, so that the freewheeling voltage may be ascertained as a mathematical function of the rotational speed. However, an external specification of freewheeling voltages via an additional interface at the controller 11 is also possible.

The freewheeling voltage to be set may also be provided to the controller 11 as controlled variables for the d- or q-components of the controlled variables; the relationship between d- and q-components and the phase voltages at the terminals of the electric machine 2 is already known. To set the required freewheeling voltage, the d-component of the voltage is regulated to zero. At a predefined transition time Δt, the voltage $U_d(t)$ results for the d-component:

$$U_d(t) = \frac{U_{d,init}}{\Delta t}(t - \Delta t)$$

$U_{d,init}$ is the regulated voltage at the start of the transition for the d-component.

The q-component of the controlled variable is adjusted as follows:

$$U_q(t) = \frac{U_q(n) - U_{q,init}}{\Delta t}(t - \Delta t) + U_q(n)$$

$U_{q,init}$ is the controlled variable of the q-component of the voltage at the start of the transition from the regulated operating mode to the freewheeling mode, and $U_q(n)$ is the open-circuit voltage of the electric machine as a function of the rotational speed n.

Thus, the d-voltage component is regulated to zero at the end of the regulating process, while the q-voltage component is set to the open-circuit voltage of the electric machine for the particular rotational speed.

This adjustment of the voltage components may be thus be carried out independently of the instantaneous phase current values. Therefore, for such an adjustment of the voltage values at the terminals of the electric machine 2, no current sensor is required for ascertaining the phase currents. The adjustment of the voltages according to the present invention at the terminals of the electric machine may therefore also be carried out if the freewheeling mode were to occur, for example, due to a fault in the sensors for the phase currents.

FIG. 3 shows a schematic representation of a flow chart on which a method 100 for operating an electric machine 2 is based. First, in a step 110, the terminals of the electric machine 2 are driven by an AC voltage. This driving of the electric machine 2 occurs in order to set a predefined torque or a predefined rotational speed as carried out in the regulated operating mode. If a fault occurs during this regulated operation, it may be necessary to terminate the regulated operating mode and to transition to a freewheeling mode. If an event is detected which makes the transition from the regulated operating mode to the freewheeling mode necessary, the regulated operating mode is subsequently terminated, and in step 120, the amplitude of the AC voltage with which the electric machine is driven is subsequently set to a predetermined value. This predetermined value is preferably the freewheeling voltage of the electric machine at the instantaneous rotational speed. This rotational speed-dependent freewheeling voltage of the electric machine may be previously calculated or alternatively read out of a memory in an additional step.

After a voltage has been set at the terminals of the electric machine 2 which corresponds to the predetermined value, i.e., preferably the freewheeling voltage, the transition to the freewheeling state is subsequently carried out. In this freewheeling state, the electric machine is no longer actively driven. Rather, in this freewheeling state, the terminals of the electric machine 2 are electrically disconnected from each other. The switching elements of an inverter which drives the electric machine 2 in the regulated operating mode are all open in this switching state.

In summary, the present invention relates to the transition of an electric machine from the regulated operating mode to the freewheeling state. To avoid voltage overshoots and related damage to the electric machine and the additional components, in particular batteries, an additional regulated phase is introduced between the end of the regulated operating mode and the freewheeling state, during which the voltage at the terminals of the electric machine is continuously adjusted from the voltage previously set in the regulated operating mode to the anticipated freewheeling voltage of the electric machine.

The invention claimed is:

1. A device for operating an electric machine (2), including
    an inverter (1) which is designed to provide an AC voltage at the terminals of the electric machine (2) in a regulated operating mode, to electrically disconnect the terminals of the electric machine from each other in a freewheeling mode (2),
    wherein the inverter (1) is designed to set the amplitude of the AC voltage provided at the terminals of the electric machine (2) to a predetermined value during a transition from the regulated operating mode to the freewheeling mode, and
    wherein the inverter is configured to electrically disconnect the terminals of the electric machine from each other only after the amplitude of the AC voltage provided at the terminals of the electric machine is set to the predetermined value.

2. The device as claimed in claim 1, wherein the predetermined value corresponds to a voltage at the terminals of the electric machine (2) in the freewheeling mode.

3. The device as claimed in claim 2, wherein the voltage at the terminals of the electric machine (2) in the freewheeling mode is determined as a function of the rotational speed of the electric machine (2).

4. The device as claimed in claim 3, including a rotational speed sensor (20) which is designed to determine the rotational speed of the electric machine (2).

5. The device as claimed in 1, wherein the inverter (1) is designed to set the amplitude of the AC voltage to the predetermined value within a predetermined period of time after the termination of the regulated operating mode.

6. The device as claimed in claim 1, wherein the inverter (1) is designed to adjust the amplitude of the AC voltage by a predefined voltage difference per period of time after the termination of the regulated operating mode.

7. An electric drive device, including: an electric machine (2); and a device as claimed in claim 1.

8. The device as claimed in claim 1, wherein the predetermined value is an anticipated freewheeling voltage at the terminals of the electric machine when the inverter is in the freewheeling mode.

9. A method (100) for operating an electric machine (2), including the steps of:
- driving (110) the terminals of the electric machine (2) with an AC voltage;
- setting (120) the amplitude of the AC voltage with which the electric machine (2) is driven to a predetermined value; and
- electrically disconnecting (130) the terminals of the electric machine (2) after the amplitude of the AC voltage has been set to the predetermined value.

10. The method (100) as claimed in claim 9, wherein the step (120) for setting the AC voltage drives the electric machine (2) with an AC voltage which corresponds to a terminal voltage of the electric machine in the freewheeling state.

* * * * *